US011474697B2

(12) United States Patent
Bivens et al.

(10) Patent No.: US 11,474,697 B2
(45) Date of Patent: *Oct. 18, 2022

(54) OPPORTUNISTIC DATA ANALYTICS USING MEMORY BANDWIDTH IN DISAGGREGATED COMPUTING SYSTEMS

(71) Applicant: INTERNATIONAL BUSINESS MACHINES CORPORATION, Armonk, NY (US)

(72) Inventors: John A. Bivens, Ossining, NY (US); Min Li, San Jose, CA (US); Ruchi Mahindru, Elmsford, NY (US); HariGovind V. Ramasamy, Ossining, NY (US); Yaoping Ruan, White Plains, NY (US); Valentina Salapura, Chappaqua, NY (US); Eugen Schenfeld, South Brunswick, NJ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 61 days.

This patent is subject to a terminal disclaimer.

(21) Appl. No.: 15/155,473

(22) Filed: May 16, 2016

(65) Prior Publication Data

US 2017/0329519 A1 Nov. 16, 2017

(51) Int. Cl.
*G06F 3/06* (2006.01)

(52) U.S. Cl.
CPC ............ *G06F 3/0604* (2013.01); *G06F 3/067* (2013.01); *G06F 3/0631* (2013.01)

(58) Field of Classification Search
None
See application file for complete search history.

(56) References Cited

U.S. PATENT DOCUMENTS

| 6,154,826 | A | 11/2000 | Wulf et al. | |
|---|---|---|---|---|
| 7,117,535 | B1 | 10/2006 | Wecker | |
| 9,083,637 | B2 | 7/2015 | Cheng | |
| 9,678,981 | B1 | 6/2017 | Taylor et al. | |
| 2001/0024239 | A1 | 9/2001 | Feder et al. | |
| 2001/0037433 | A1 | 11/2001 | Dempsey et al. | |
| 2003/0145186 | A1 | 7/2003 | Szendy et al. | |
| 2004/0073677 | A1* | 4/2004 | Honma | G06F 3/067 709/226 |
| 2004/0267897 | A1* | 12/2004 | Hill | G06F 9/505 709/217 |
| 2012/0226804 | A1 | 9/2012 | Raja et al. | |
| 2014/0280687 | A1* | 9/2014 | Egi | G06F 15/17331 709/214 |
| 2014/0372723 | A1* | 12/2014 | Bobroff | G06F 11/3034 711/170 |

(Continued)

*Primary Examiner* — Arpan P. Savla
*Assistant Examiner* — Eric T Loonan
(74) *Attorney, Agent, or Firm* — Griffiths & Seaton PLLC (57) ABSTRACT

Various embodiments for optimizing memory bandwidth in a disaggregated computing system, by a processor device, are provided. Respective memory devices are assigned to respective processor devices in the disaggregated computing system, the disaggregated computing system having at least a pool of the memory devices and a pool of the processor devices. An analytic function is performed on data resident in the pool of the memory devices using memory bandwidth not currently committed to a primary compute task.

12 Claims, 5 Drawing Sheets

(56) References Cited

U.S. PATENT DOCUMENTS

| | | | |
|---|---|---|---|
| 2015/0227586 A1* | 8/2015 | Li | G06F 9/5027 707/769 |
| 2015/0381426 A1* | 12/2015 | Roese | H04L 41/0896 709/226 |
| 2016/0306574 A1* | 10/2016 | Friedman | G06F 3/0619 |
| 2016/0359683 A1* | 12/2016 | Bartfai-Walcott | H04L 41/5009 |

* cited by examiner

OPPORTUNISTIC DATA ANALYTICS USING MEMORY BANDWIDTH IN DISAGGREGATED COMPUTING SYSTEMS

BACKGROUND OF THE INVENTION

Field of the Invention

The present invention relates generally to large scale computing, and more particularly to pooling and dynamically distributing hardware resources for enhanced computing efficiency.

Description of the Related Art

A popular type of large scale computing is cloud computing, in which resources may interact and/or be accessed via a communications system, such as a computer network. Resources may be software-rendered simulations and/or emulations of computing devices, storage devices, applications, and/or other computer-related devices and/or services run on one or more computing devices, such as a server. For example, a plurality of servers may communicate and/or share information that may expand and/or contract across servers depending on an amount of processing power, storage space, and/or other computing resources needed to accomplish requested tasks. The word "cloud" alludes to the cloud-shaped appearance of a diagram of interconnectivity between computing devices, computer networks, and/or other computer related devices that interact in such an arrangement.

Cloud computing may be provided as a service over the Internet, such as in the form of "Infrastructure as a Service" (IaaS), "Platform as a Service" (PaaS), and/or "Software as a Service" (SaaS). IaaS may typically provide physical or virtual computing devices and/or accessories on a fee-for-service basis and onto which clients/users may load and/or install, and manage, platforms, applications, and/or data. PaaS may deliver a computing platform and solution stack as a service, such as, for example, a software development platform, application services, such as team collaboration, web service integration, database integration, and/or developer community facilitation. SaaS may deploy software licensing as an application to customers for use as a service on demand. SaaS software vendors may host the application on their own clouds or download such applications from clouds to cloud clients, disabling the applications after use or after an on-demand contract expires.

The provision of such services allows a user access to as much in the way of computing resources as the user may need without purchasing and/or maintaining the infrastructure, such as hardware and/or software, that would be required to provide the services. For example, a user may instead obtain access via subscription, purchase, and/or otherwise securing access. Thus, cloud computing may be a cost effective way to deliver information technology services. However, cloud computing may also be hindered by issues of resource configuration and allocation aspects.

SUMMARY OF THE INVENTION

Various embodiments for optimizing memory bandwidth in a disaggregated computing system, by a processor device, are provided. Respective memory devices are assigned to respective processor devices in the disaggregated computing system, the disaggregated computing system having at least a pool of the memory devices and a pool of the processor devices. An analytic function is performed on data resident in the pool of the memory devices using memory bandwidth not currently committed to a primary compute task.

In addition to the foregoing exemplary embodiment, various other system and computer program product embodiments are provided and supply related advantages. The foregoing Summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Computing resources are usually pre-configured by vendors at fixed levels of configurations. One aspect is that each individual computing resource, such as memory size, number of CPUs, disk size, etc. has a limited boundary. Another aspect is that each computing platform has a limited number of physical customization options. Today's workloads are running under these limitations, which subsequently is a reason that techniques such as memory swapping and caching optimization are used in computing environments.

The emergence of cloud computing changes the paradigm of how people utilize computing resources by providing a pay-as-you-go model. The public cloud has been created by service providers to allow access to those who need such computing resources on demand. As aforementioned, access to cloud resources is provided through the Internet or private network connections or through co-location of fixed infrastructure held as a base, augmented by on demand resources when needed. The underlying infrastructure, however, is a set of fixed computing configurations which provide inflexibility when scaling or descaling demands are appropriate.

The underlying architecture of the Infrastructure as a Service (IaaS) cloud is generally traditional hardware used in data centers as described above. Users either access the hardware directly, or access virtual machines contained thereon. However, because of the fixed nature of building servers as enclosures that are configured once, when the enclosure is built, the fundamental architecture underneath the data center is very rigid and inflexible. It is thus the cloud software that provides the emulation to create the flexible, on-demand functionality that cloud services are known for. This functionality is quite limited however, as many mechanisms depend on software relying on server enclosures, which architectures originated early in the Personal Computer era, turning into an on-demand service.

The Virtual Machine (VM) is a software technique based on an entity that runs on a part of a server, possibly with other such entities sharing the same server. It represents the unit of on-demand computation, where each such entity is designated with a pre-defined number of virtual CPUs and memory. Once defined, a VM cannot change its base resources, such as adding memory or adding virtual CPUs. This is because such a VM shares the hardware resources of a fixed pre-built server enclosure with other VMs, and it may not be possible to displace other users to make room for the resource expansion of the first user. While such is possible in principle (e.g. by migrating other users (live VM migration) to other servers), such an operation would create an abundant increase in traffic and require an overload on a datacenter network. In addition, the provisioning of new VMs on-demand can take an impractical amount of time, relatively speaking (e.g. minutes, while real-world events may require a response to events in sub-second times). Thus the notion of true, real-world and corresponding on-demand cloud infrastructure does not exist. This situation may force users to provision resources for worse-case needs (max processor number/speed, max memory) and to keep VMs even if unneeded, only to be able to respond to real-world events in relative time.

For cloud services achieved via Application Programming Interfaces (APIs), users do not access the operating system directly, but rather issue requests via the APIs. The computation is then handled by the underlying operating system and hardware infrastructure. Some vendors provide a certain level of scaling and elasticity that are transparent to user APIs. However, the level of scaling is limited by the type of application and by the capacity of the individual computing resource. For example, if a workload requires a high demand of memory usage, it is not possible to scale up on memory size individually. Therefore, the overall resource utilization is poor and this solution is not cost-effective either.

In view of the forgoing, disaggregated computing systems provide flexibility and elasticity in constructing bare-metal computing systems for use in the cloud, to provide on-demand flexibility to cloud users, or "tenants". A disaggregated computing system is referred to as a system with large pools of physical hardware resources, such as CPUs, accelerators, memory devices, and storage devices, whose connectivity with each other individual hardware resource can be dynamically switched without shutting down any hardware nor running applications. Individual hardware resources from these pools can be selected to assemble computer systems on-demand. Thus, a bare-metal computer system with a flexible capacity of individual computing resources may be assembled in a disaggregated system, such that workloads are computed based on hardware resource configurations that are most suitable for the respective workload. In one embodiment, for example, a system may be constructed with an extremely high capability of memory size but with a more moderate capacity of CPU and other resources, for a memory-intensive workload.

One advantageous component of disaggregated computing systems is the opportunity to perform computation between various hardware resources in ways previously unattainable. For example, in most pre-configured computing systems, pre-fetching techniques and data locality help to keep cache hit rates high, enabling ultra-fast performance for the end user. However, if the processor spends a vast amount of time finding the needed data in the cache, it may be under-utilizing bandwidth to main memory. Since the disaggregated architecture permits additional processing components to be connected to various memory pool modules, a method to better utilize this bandwidth to memory modules is proposed by efficiently connecting to the memory modules from other processing components (during times of low usage) to perform analytic functions which may lead to valuable insights about the data, or its processing. Such memory access will not pass through the usual symmetric multiprocessing (SMP) fabric connecting processors, and hence does not disturb inter-processor communication and coherency when really needed, increasing efficiency further.

Figure 1:
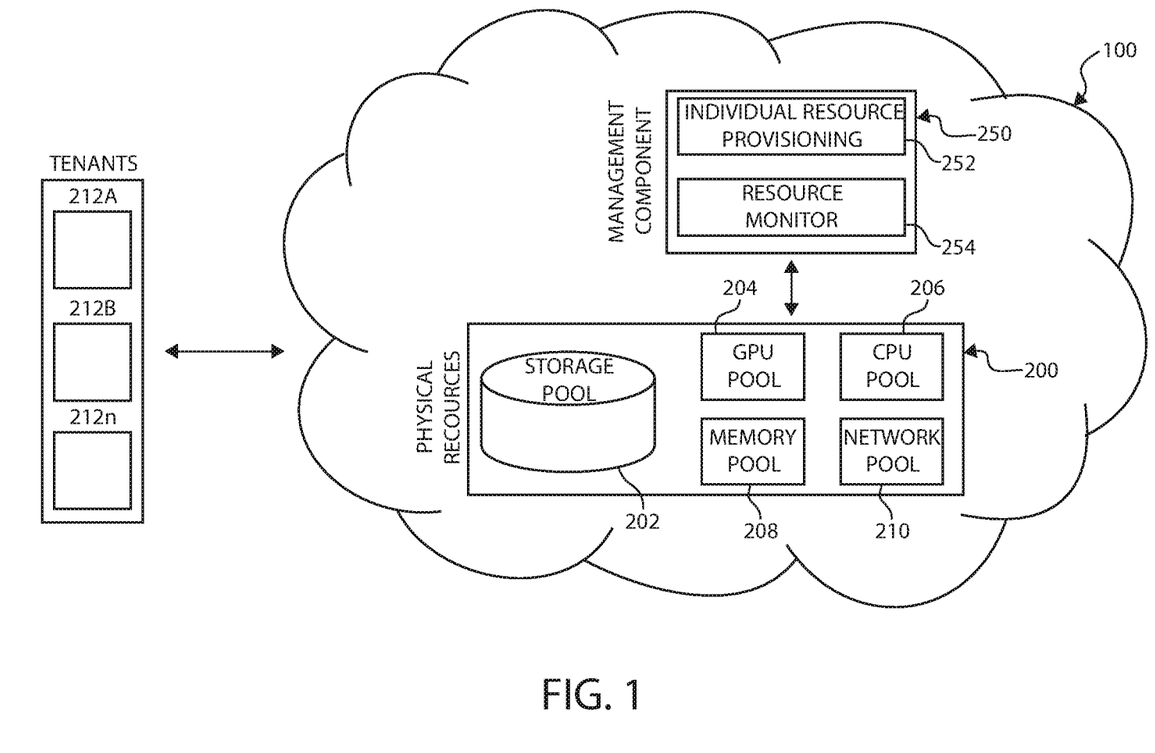
FIG. 1 is a block diagram showing a hardware structure of a disaggregated computing environment, in which aspects of the present invention may be realized.

Turning now to FIG. 1, a block diagram of a disaggregated computing environment is illustrated, including cloud environment 100. Within cloud environment 100 is the disaggregated computing system comprising physical hardware resources 200. Physical hardware resources 200 may comprise of classifications of the hardware resources such as a storage device pool 202, a Graphics Processing Unit (GPU) device pool 204, a CPU device pool 206, a memory device pool 208, and a network device pool 210. The physical hardware resources 200 are in communication with a management module 250. Management module 250 may comprise of such components as an individual resource provisioning component 252 and a resource monitor 254, each described herein.

In communication with the cloud environment 100, the management module 250 and the physical hardware resources 200, are tenants 212A, 212B, and 212n. Tenants 212A, 212B, and 212n may communicate with the cloud environment 100 by way of the management module 250, and thus the physical resources 200 provided by any signal-bearing medium.

Figure 2:
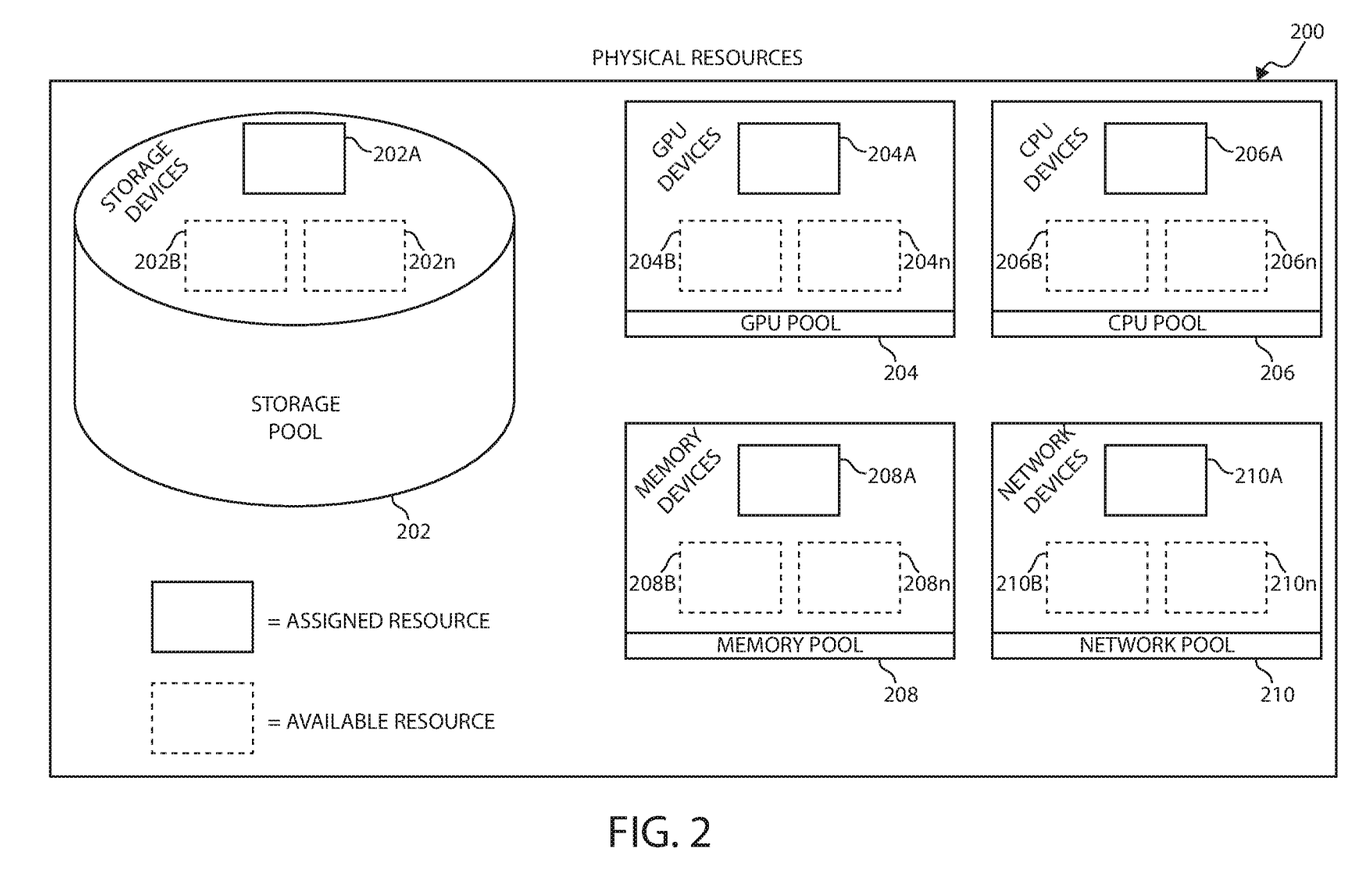
FIG. 2 is an additional block diagram showing a hardware structure of a disaggregated computing environment, in which aspects of the present invention may be realized.

It should be noted that the elements illustrated in FIG. 2 provide only an example of related components that may be included in the disaggregated computing architecture. For example, management module 250 may include other components than individual resource provisioning component 252 and resource monitor 254, and physical hardware resources 200 may include other component classifications than storage device pool 202, GPU device pool 204, CPU device pool 206, and memory device pool 208, while staying in spirit and scope of the present invention. Additionally, the duties of the management module 250, and thus the components therein, may be performed and comprised of physical components, computer code, or a combination of such.

In one embodiment, the management module 250 interacts with individual tenants 212A-n to receive workload requests and locate the best suitable hardware resources for the given workload. Individual hardware resources of the hardware resources 200 are tracked and a mapping is maintained between each respective tenant 212A-n and respective assigned hardware resource. Each hardware resource is identified using a unique identifier. This identifier may be a physical identifier (e.g. barcode) and/or a virtual identifier (e.g. code based). The management module 250, or any other suitable modules or means known in the art may be used to accomplish these mechanisms.

FIG. 2 is a block diagram illustrating the physical hardware resources 200 portion of FIG. 1. Included in the storage device pool 202 are storage devices 202A, 202B, and 202n. The GPU device pool 204 includes GPU devices 204A, 204B, and 204n. The CPU device pool 206 includes CPU devices 206A, 206B, and 206n. The memory device pool 208 includes memory devices 208A, 208B, and 208n. Finally, the network device pool 210 includes network devices 210A, 210B, and 210n. Each aforementioned hardware resource may be in communication with an additional one or more aforementioned hardware resources via a signal-bearing medium.

Within physical hardware resources 200, each hardware resource appearing in solid line (i.e. storage device 202A, GPU device 204A, CPU device 206A, memory device 208A, and network device 210A) is assigned hardware resources to one or more tenants (i.e. tenants 212A, 212B, 212n). Hardware resources appearing in dashed line (i.e. storage devices 202B, 202n, GPU devices 204B, 204n, CPU devices 206B, 206n, memory devices 208B, 208n, and network devices 210B, 210n) are unassigned hardware resources which are available on-demand for a respective tenant 212A-n workload.

Each respective tenant 212A-n may be assigned individual respective hardware resources 200 in arbitrary quantities. In one embodiment, each respective tenant 212A-n may be assigned an arbitrary quantity of an individual respective hardware resource 200 within a limit of total system capacity and/or an available quantity of the respective hardware resources 200. For example, a memory device 208A-n allocated from the memory pool to a respective tenant 212A-n may be provided in a minimal unit of allocation (e.g. a byte or word) up to a limit of total system capacity and/or an available quantity of the memory devices 208A-n.

In another embodiment, each respective tenant 212A-n may be assigned individual respective hardware resources 200 within a quantum step sizing restriction. For example, memory devices 208A-n may need to be allocated on quantum sizes of full or half of memory DIMM units, to assure full bandwidth from the respective memory device 208A-n to the processor when reading/writing data. This is especially true in a disaggregated system since the memory device 208A-n is directly connected via fiber/optical switch to the processor (for read/write memory transactions) as if it was locally connected to the processor chip, but rather may be a small distance (e.g. 1 meter) away in location. In another example, because the disaggregated system is not based on virtual components but rather physical components (i.e. actual chips than cores or VMs), the quantum sizing restriction may require that a minimum of one CPU device 206A-n be assigned to a tenant 212A-n, with additional CPU devices 206A-n being provisioned to the tenant 212A-n in two, four, etc. quantities.

Opportunistic Data Analytics

In various embodiments, the memory pool 208 allocates different memory devices 208A-$i$ minimal granularity of allocation and thus sharing of bandwidth) to different instances of CPU devices 206A-n. While a given memory device 208A-n could be assigned to be shared among two different instances of different tenants 212A-n, such would have implications on the full bandwidth from the particular memory device 208A-n (both read/write) if more than one tenant accesses that module at the same time. Hence, within the basic memory module allocation block (e.g. a DIMM module), separate blocks may be assigned to different tenants 212A-n and switched such from one bare-metal service to another; or suspended if there is no workload needed other than to keep the instance warm and ready to resume very quickly when work begins (fast agility and elasticity per component). Because of this capability, idle or otherwise designated components may be assigned to perform analytic functions on data at rest in memory devices 208A-n which have been allocated for other purposes but whose bandwidth is currently underutilized, in order to perform analyses which may lead to valuable insights about the data contained therein or its processing.

Figure 3:
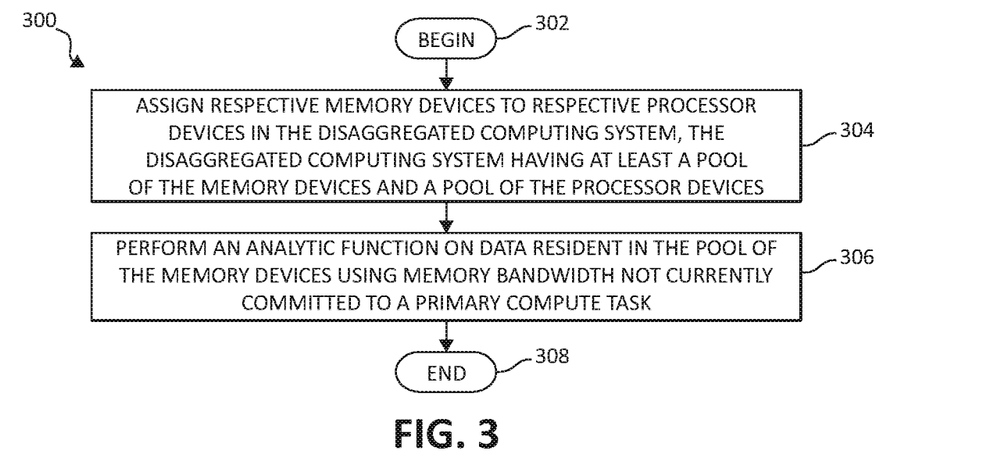
FIG. 3 is a flow chart diagram illustrating a method for optimizing bandwidth in a disaggregated computing system in accordance with various aspects of the present invention.

Advancing, FIG. 3 illustrates a method 300 for optimizing memory bandwidth in a disaggregated computing system. The method 300 may be performed in accordance with the present invention in any of the environments depicted in FIGS. 1, 2, and 4 (described infra), among others, in various embodiments. Of course, more or less operations than those specifically described in FIG. 3 may be included in method 300, as would be understood by one of skill in the art upon reading the present descriptions.

Each of the steps of the method 300 may be performed by any suitable component of the operating environment. For example, in various embodiments, the method 300 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a Central Processing Unit (CPU), an Application Specific Integrated Circuit (ASIC), a Field Programmable Gate Array (FPGA), etc., combinations thereof, or any other suitable computing device known in the art.

The method 300 begins (step 302) with respective memory devices being assigned to respective processor devices in the disaggregated computing system, the disaggregated computing system having at least a pool of the memory devices and a pool of the processor devices (step 304). An analytic function is performed on data resident in the pool of the memory devices using memory bandwidth not currently committed to a primary compute task (step 306). The method ends (step 308).

As aforementioned, because of the capability to granularly assign blocks within the disaggregated computing system, idle or otherwise designated components may be assigned to data at rest in memory devices 208A-n which have been allocated for other purposes but whose bandwidth is currently underutilized, in order to perform analytic functions which may lead to valuable insights about the data contained therein or its processing. These analytic functions may be such functions as virus checking, compression or compression operation estimations, data organization, data curation, data code or pattern checking, insight analytics, or a host of related data analyses. The importance of data issues such as coherency and dataset awareness depends on the needs of the specific analytic function. If, for example, the analytic workload requires a most recent and coherent view of the data, well-known forced consistency techniques may be used (cache flushing, etc.). In addition, many analytic workloads do not require a view of the entire data set. If this type of context is required, the analytic workloads could easily be run on data sets that can fully fit in memory, or the context may be provided by the user in the form of a data map showing which data sections reside in memory and which sections reside in a secondary storage.

Figure 4:
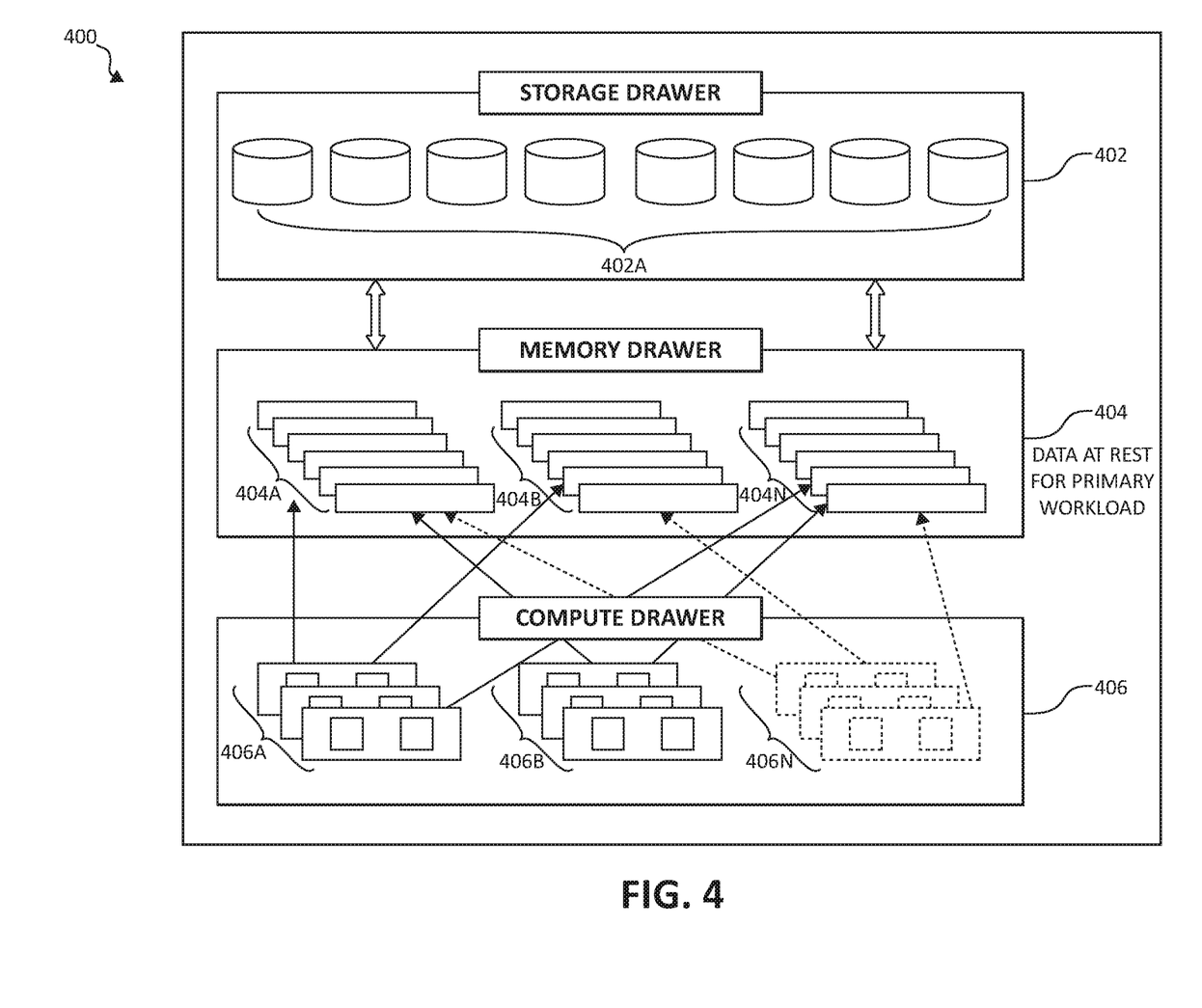
FIG. 4 is still an additional block diagram showing a hardware structure of a disaggregated computing environment, in which aspects of the present invention may be realized.

FIG. 4 is an additional block diagram illustrating a hardware structure of a disaggregated computing environment 400, sharing the principle architecture discussed in FIGS. 1 and 2. Depicted are a storage drawer 402 having storage devices 402A, a memory drawer 404 having memory modules 404A, 404B, and 404n, and a compute drawer 406 having processors 406A, 406B, and 406n. Each of the storage drawer 402, memory drawer 404, and compute drawer 406, and thus the components contained therein, may be in communication by a provided signal-bearing medium. The processor devices 406A and 406B depict committed compute resources currently being used in primary compute tasks. Processor devices 406n depict committed compute resources currently idle due to efficient resource utilization. These idle resources, whether currently committed or not currently committed to a primary compute task, may be used to perform the various analytic functions.

In one embodiment, a computing resource selection technique may be used to select computational resources for the use of the analytic functions on data at rest in the memory modules 404A-n and storage devices 402A. The computing resource selection may be configured or provided by an administrator, such that the administrator designates a particular set of processors 406A-n to be used for computing the analytic functions. The system may use idle unallocated computational resources (e.g. processor devices 406A, 406B), or the system may use idle allocated resources (e.g. processor device 406n). Furthermore, the system may consider the length of time or frequency in which the resource is idle in selecting the most appropriate computing resource for the analytic workloads.

Memory modules 404A-n may be monitored and compared to other candidate modules for selection in performing the analytic function. An infrequently used one or more of the memory modules 404A-n may be targeted using a plurality of CPU-related data factors, such as high cache hit rate, etc., so as not to impact, but fully utilize bandwidth to the memory. In some embodiments, memory-related usage data such as predicted memory usage, average usage, or usage below a predetermined threshold factor may be used in selecting the one or more memory modules 404A-n for performing the analysis. In additional embodiments, data-related information, such as a percentage of the dataset most represented in memory or which datasets have highest priority, may also be used to select the one or more memory modules 404A-n for performing the analysis. Any combination of the abovementioned CPU, memory, and dataset information can be used for this selection.

As previously discussed, while some analytics capabilities do not need context of the entire dataset in order to reach valuable insights (e.g. compression analysis, virus checking, etc.), many analytic capabilities will. For those that will, an understanding of the location of the entire dataset is necessitated as well as what fraction of it can be seen and analyzed from the candidate memory modules. For analytic workloads whose data sets fit entirely in memory, this mapping isn't needed. For analytic workloads with larger data sets, user provided mappings can be used to guide the workload's calculations.

Figure 5:
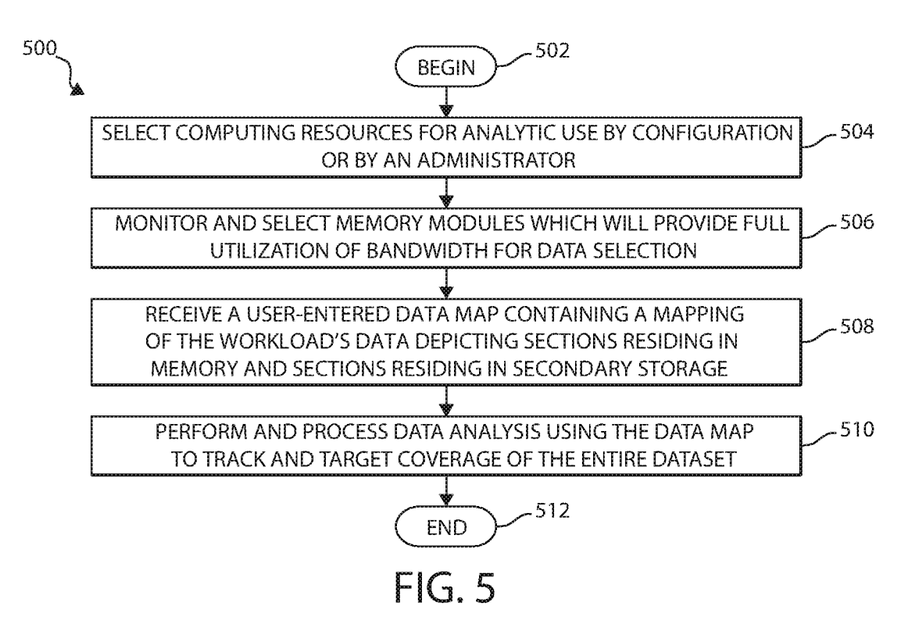
FIG. 5 is an additional flow chart diagram illustrating a method for optimizing memory bandwidth in a disaggregated computing system in accordance with various aspects of the present invention.

Concluding, FIG. 5 illustrates a method 500 for optimizing memory bandwidth in a disaggregated computing system. The method 500 may be performed in accordance with the present invention in any of the environments depicted in FIGS. 1, 2, and 4, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a Central Processing Unit (CPU), an Application Specific Integrated Circuit (ASIC), a Field Programmable Gate Array (FPGA), etc., combinations thereof, or any other suitable computing device known in the art.

The method 500 begins (step 502) with the selection of computational resources via processors 406A-n for performing the analytic function. The computational resources may be configured, pre-configured, or selected by an administrator (step 504). One or more memory modules 404A-n may then be monitored for usage or predicted usage below an average or a predetermined threshold, and selected to be used to perform the analytic function on data at rest in the memory modules 404A-n (step 506). User provided data maps may be used for context-based analyses (step 508). The analytic function and data analysis is performed and processed using the data map to track and target coverage of the analytic function (step 510). The method ends (step 512).

The present invention may be an apparatus, a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

What is claimed is:

1. A method for optimizing memory bandwidth in a disaggregated computing system, by a processor device, comprising:

assigning respective memory devices to respective processor devices from the disaggregated computing system, the disaggregated computing system having at least a pool of the memory devices and a pool of the processor devices, wherein the assigning includes allocating a first portion of a first memory device of the respective memory devices to a first tenant and allocating a second portion of the first memory device to a second tenant;

selecting the first memory device of the pool of memory devices with which to perform an analytic function based on a statistical analysis indicating each of a cache hit rate of the first memory device is above a predetermined threshold and an average or probable usage of the first memory device is below a predetermined threshold;

determining the first memory device has unused memory bandwidth otherwise allocated to at least one of a first primary compute task of the first tenant and a second primary compute task of the second tenant, wherein data currently residing in the first memory device is used in performing the at least one of the first primary compute task and the second primary compute task;

responsive to determining the first memory device has unused memory bandwidth, determining, according to a type of the analytic function, whether predetermined criterion are met to satisfactorily execute the analytic function, wherein the predetermined criterion include identifying whether the analytic function requires a most recent and coherent copy of the data, whether the analytic function requires all workload data associated with at least one of the first primary compute task and the second primary compute task to which the analytic function corresponds, and whether the data currently residing in the first memory device represents all of the workload data;

responsive to determining each of the predetermined criterion are met to satisfactorily execute the analytic function, determining a designated processor device of the respective processor devices, connected to the first memory device via an optical switch, to perform the analytic function;

responsive to determining the designated processor device, opportunistically performing the analytic function of a first computational operation on the data resident in the first memory device using the unused memory bandwidth, wherein the analytic function is executed independently from the primary compute task and the second compute task to compute information associated with the data; and executing the analytic function on the data in the first memory device by the designated processor device.

2. The method of claim 1, further including receiving user input for designating the designated processor device of the pool of processor devices to be used to perform computation of the analytic function; and using the designated processor device of the pool of processor devices to perform computation of the analytic function when the designated processor device is determined to be idle.

3. The method of claim 1, further including receiving a user-entered data map containing a mapping of all the workload data between sections of the data resident in the first memory device and sections residing in a secondary storage, for performing the analytic function.

4. The method of claim 3, further including using the user-entered data map to track and target coverage of the analytic function of all of the workload data associated with the at least one of the first primary compute task and the second primary compute task.

5. A system for optimizing memory bandwidth in a disaggregated computing system, the system comprising:

at least one processor device, wherein the at least one processor device:

assigns respective memory devices to respective processor devices from the disaggregated computing system, the disaggregated computing system having at least a pool of the memory devices and a pool of the processor devices, wherein the assigning includes allocating a first portion of a first memory device of the respective memory devices to a first tenant and allocating a second portion of the first memory device to a second tenant;

selects the first memory device of the pool of memory devices with which to perform an analytic function based on a statistical analysis indicating each of a cache hit rate of the first memory device is above a predetermined threshold and an average or probable usage of the first memory device is below a predetermined threshold;

determines the first memory device has unused memory bandwidth otherwise allocated to at least one of a first primary compute task of the first tenant and a second primary compute task of the second tenant, wherein data currently residing in the first memory device is used in performing the at least one of the first primary compute task and the second primary compute task;

responsive to determining the first memory device has unused memory bandwidth, determines, according to a type of the analytic function, whether predetermined criterion are met to satisfactorily execute the analytic function, wherein the predetermined criterion include identifying whether the analytic function requires a most recent and coherent copy of the data, whether the analytic function requires all workload data associated with at least one of the first primary compute task and the second primary compute task to which the analytic function corresponds, and whether the data currently residing in the first memory device represents all of the workload data;

responsive to determining each of the predetermined criterion are met to satisfactorily execute the analytic function, determines a designated processor device of the respective processor devices, connected to the first memory device via an optical switch, to perform the analytic function;

responsive to determining the designated processor device, opportunistically performs the analytic function of a first computational operation on the data resident in the first memory device using the unused memory bandwidth, wherein the analytic function is executed independently from the primary compute task and the second compute task to compute information associated with the data; and executes the analytic function on the data in the first memory device by the designated processor device.

6. The system of claim 5, wherein the at least one processor device receives user input for designating the designated processor device of the pool of processor devices to be used to perform computation of the analytic function; and uses the designated processor device of the pool of processor devices to perform computation of the analytic function when the designated processor device is determined to be idle.

7. The system of claim 5, wherein the at least one processor device receives a user-entered data map containing a mapping of all the workload data between sections of the data resident in the first memory device and sections residing in a secondary storage, for performing the analytic function.

8. The system of claim 7, wherein the at least one processor device uses the user-entered data map to track and target coverage of the analytic function of all of the workload data associated with the at least one of the first primary compute task and the second primary compute task.

9. A computer program product for optimizing memory bandwidth in a disaggregated computing system by at least one processor device, the computer program product embodied on a non-transitory computer-readable storage medium having computer-readable program code portions stored therein, the computer-readable program code portions comprising:

an executable portion that assigns respective memory devices to respective processor devices from the disaggregated computing system, the disaggregated computing system having at least a pool of the memory devices and a pool of the processor devices, wherein the assigning includes allocating a first portion of a first memory device of the respective memory devices to a first tenant and allocating a second portion of the first memory device to a second tenant;

an executable portion that selects the first memory device of the pool of memory devices with which to perform an analytic function based on a statistical analysis indicating each of a cache hit rate of the first memory device is above a predetermined threshold and an average or probable usage of the first memory device is below a predetermined threshold;

an executable portion that determines the first memory device has unused memory bandwidth otherwise allocated to at least one of a first primary compute task of the first tenant and a second primary compute task of the second tenant, wherein data currently residing in the first memory device is used in performing the at least one of the first primary compute task and the second primary compute task;

an executable portion that, responsive to determining the first memory device has unused memory bandwidth, determines, according to a type of the analytic function, whether predetermined criterion are met to satisfactorily execute the analytic function, wherein the predetermined criterion include identifying whether the analytic function requires a most recent and coherent copy of the data, whether the analytic function requires all workload data associated with at least one of the first primary compute task and the second primary compute task to which the analytic function corresponds, and whether the data currently residing in the first memory device represents all of the workload data;

an executable portion that, responsive to determining each of the predetermined criterion are met to satisfactorily execute the analytic function, determines a designated processor device of the respective processor devices, connected to the first memory device via an optical switch, to perform the analytic function;

an executable portion that, responsive to determining the designated processor device, opportunistically performs the analytic function of a first computational operation on the data resident in the first memory device using the unused memory bandwidth, wherein the analytic function is executed independently from the primary compute task and the second compute task to compute information associated with the data; and an executable portion that executes the analytic function on the data in the first memory device by the designated processor device.

10. The computer program product of claim 9, further including an executable portion that receives user input for designating the designated processor device of the pool of processor devices to be used to perform computation of the analytic function; and an executable portion that uses the designated processor device of the pool of processor devices to perform computation of the analytic function when the designated processor device is determined to be idle.

11. The computer program product of claim 9, further including an executable portion that receives a user-entered data map containing a mapping of all the workload data between sections of the data resident in the first memory device and sections residing in a secondary storage, for performing the analytic function.

12. The computer program product of claim 11, further including an executable portion that uses the user-entered data map to track and target coverage of the analytic function of all of the workload data associated with the at least one of the first primary compute task and the second primary compute task.

\* \* \* \* \*